US005568392A

United States Patent [19]

Flickner et al.

[11] Patent Number: 5,568,392

[45] Date of Patent: Oct. 22, 1996

[54] DOCUMENT EDGE MARKING APPARATUS

[76] Inventors: Brett J. Flickner, 259 Wellfleet Cir., Folsom, Calif. 95630; Charles E. Preston, 9445 Central Ave., Orangevale, Calif. 95662; Daniel M. Saldana, 11082 Erla Ct., Rancho Cordova, Calif. 95670; Jonathan D. Emigh, 7050 Mt. Aukum Rd., Somerset, Calif. 95684; Marc J. Fagan, 2786 Brentwood Pl., Davis, Calif. 95616; Steven L. Mulkey, 2687 Hillcrest Dr., Cameron Park, Calif. 95682; Cindy M. Spear, 15288 Medella Cir., Rancho Murieta, Calif. 95683; Lino E. Carnesecca, 465 Homestead Ct., Lincoln, Calif. 95648; David P. Pensa, Jr., 3831 Ziana Rd., Cameron Park, Calif. 95682

[21] Appl. No.: 319,428

[22] Filed: Oct. 6, 1994

[51] Int. Cl.[6] .................. G06F 17/00

[52] U.S. Cl. .................. 364/478.15; 364/464.02; 364/478.08; 364/478.12; 209/584

[58] Field of Search .................. 364/464.01, 464.02, 364/464.03, 464.04, 478; 209/583, 584, 900; 156/350, 352, 363, 364, 384, 387; 400/279

[56] References Cited

U.S. PATENT DOCUMENTS

| | | | |
|---|---|---|---|
| 4,639,918 | 1/1987 | Linkowski | 364/464.03 |
| 4,769,110 | 9/1988 | Ohno et al. | 156/350 |
| 5,215,554 | 10/1993 | Eckert, Jr. et al. | 364/464.03 |
| 5,217,551 | 6/1993 | Nobile et al. | 156/64 |
| 5,373,450 | 12/1994 | Gallagher et al. | 364/478 |

*Primary Examiner*—Roy N. Envall, Jr.
*Assistant Examiner*—Thomas E. Brown
*Attorney, Agent, or Firm*—James M. Ritchey

[57] ABSTRACT

A system for marking an edge of a mailing piece with a desired indicia, thereby permits identification of the marked mailing piece when the marked mailing piece is stacked with other mailing pieces, usually similar mailing pieces. A computer directs which mailing piece is to be marked and activates the marking process. A group of computer controlled solenoids, with each solenoid linked to an indicia imprinting marking pad, is activated for the edge marking. Each activated solenoid forces the marking pad against the mailing piece's edge thereby marking the edge of the mailing piece.

3 Claims, 3 Drawing Sheets

DOCUMENT EDGE MARKING APPARATUS

BACKGROUND OF THE INVENTION

1. Field of the Invention

A device for marking the edge of a document with indicia relevant for processing the document is disclosed. More specifically, an apparatus is related that labels the edges of important or strategic envelopes that are stacked into piles for later quick identification of those important or strategic envelopes.

2. Description of the Background Art

During the processing of bulk mailings or large quantities of mailing pieces within mailing trays, it often becomes necessary to find a particular mailing piece. Since the mailing pieces are usually stacked within a mailing tray with only their edges showing, to find a particular piece mailing piece is traditionally a time consuming and tedious endeavor. In order to make a functional profit in operating a bulk mailing program, bulk mailing firms rely on being very efficient. The time and effort required to identify particular piece within a mailing tray has not been profitable. The subject invention is a dynamic system that marks the edge of any particular mailing piece, often, if required, after it is assembled, as directed by a computer means in response to selected criteria. This novel and nonobvious system overcomes the limitations found in the prior traditional operational methods by permitting the bulk mailer to mark edges of mailing pieces with regions of codes comprising indicia of colors (black and other colors), magnetic imprints, bar codes, and the like for quick identification by an operator or identifying assemblage.

SUMMARY OF THE INVENTION

An object of the present invention is to provide a system that places identifying marks on the edges of mailing pieces so that those identifying marks can be detected when the mailing pieces are stacked.

Another object of the present invention is to furnish a system that dynamically responds to a computer means tracking mailing pieces being processed for mailing and, when directed to do so by the computer means, places identifying indicia on the edge of a particular mailing piece or pieces.

A further object of the present invention is to disclose a marking apparatus for placing identifying indicia on the edges of mailing pieces.

Still another object of the present invention is to supply an envelope marking device that positions an identifying code on the edge of the envelope.

Yet a further object of the present invention is to produce a mailing piece edge marking apparatus comprising a plurality of computer controlled marking pens which respond to the computer and place desired indicia on the edge of the mailing piece.

Disclosed is a system for marking an edge of a mailing piece, thereby permitting identification of the marked mailing piece. Generally, the subject invention comprises means for determining if the edge of the mailing piece is to be marked, means for directing the marking of the edge of the mailing piece, and means for marking the edge of the mailing piece.

More specifically, the subject system for marking an edge of a mailing piece, thereby permitting identification of the marked mailing piece within a stack of usually similar mailing pieces, comprises computer means for determining if the edge of the mailing piece is to be marked and for directing the marking of the edge of the mailing piece. Included is an indicia placing means that transfers a characteristic mark to at least the edge of the mailing desired piece, usually after the mailing piece is assembled. The characteristic mark is, when the marked mailing piece is stacked with other similar mailing pieces, either or both an operator readable indicia or/and a machine readable indicia.

Ordinarily the subject apparatus marking means comprises a plurality of indicia imprinting means. Preferably, each indicia imprinting means within the plurality of indicia imprinting means is a solenoid linked to an inked marking pad, wherein when the solenoid is activated the solenoid forces the marking pad against the mailing piece's edge thereby marking the edge of the mailing piece. Generally, each marking pad has a characteristic ink color not duplicated in another solenoid linked marking pad within the plurality of indicia imprinting means. When each of the solenoids is activated the solenoid forces the marking pad against the mailing piece's edge thereby marking the edge of the mailing piece with any one color or a plurality of colors.

Other objects, advantages, and novel features of the present invention will become apparent from the detailed description that follows, when considered in conjunction with the associated drawings.

DESCRIPTION OF THE PREFERRED EMBODIMENT

Figure 1:
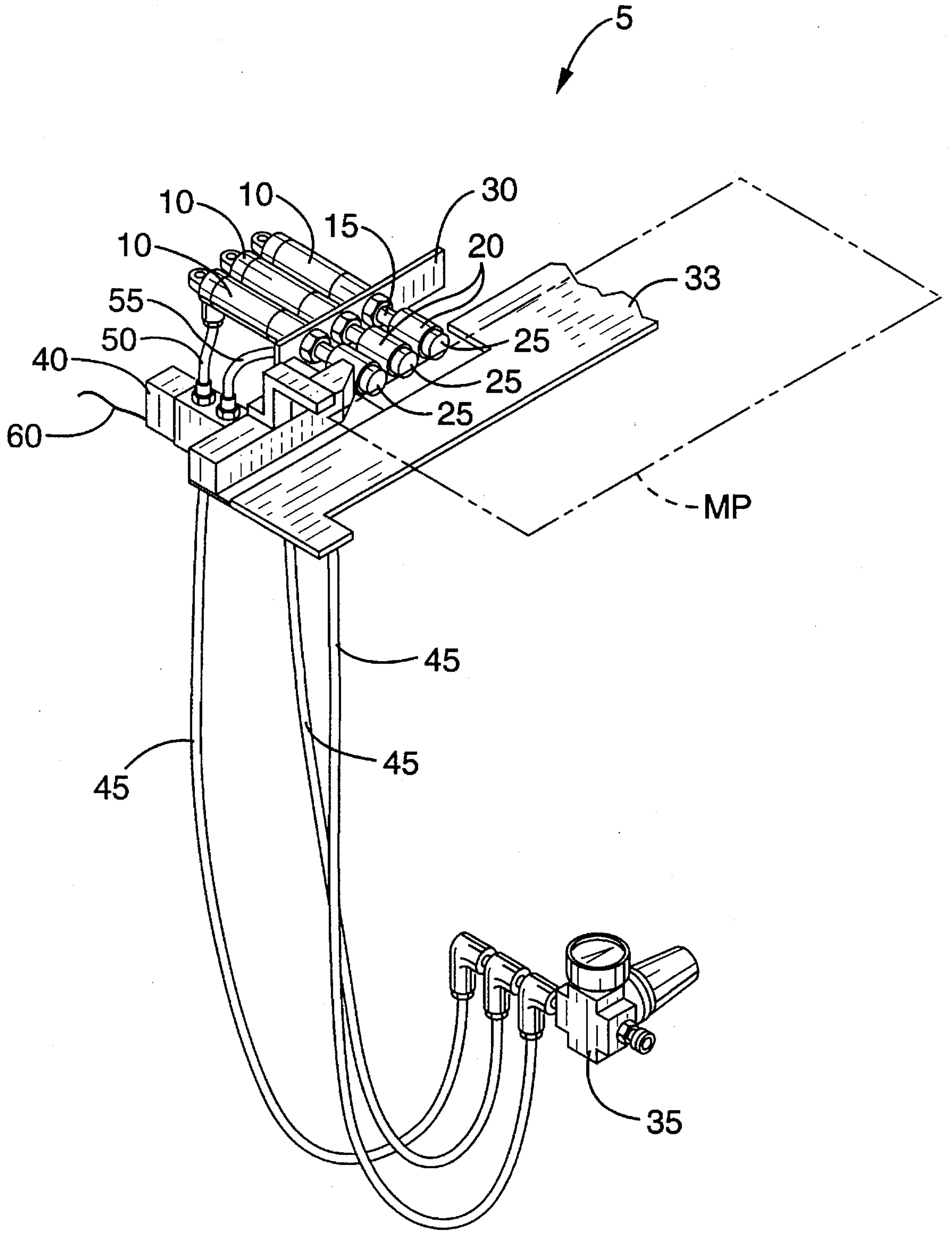
FIG. 1 is a perspective view of the subject invention showing a preferred embodiment thereof, including a typical mounting plate.
Figure 2:
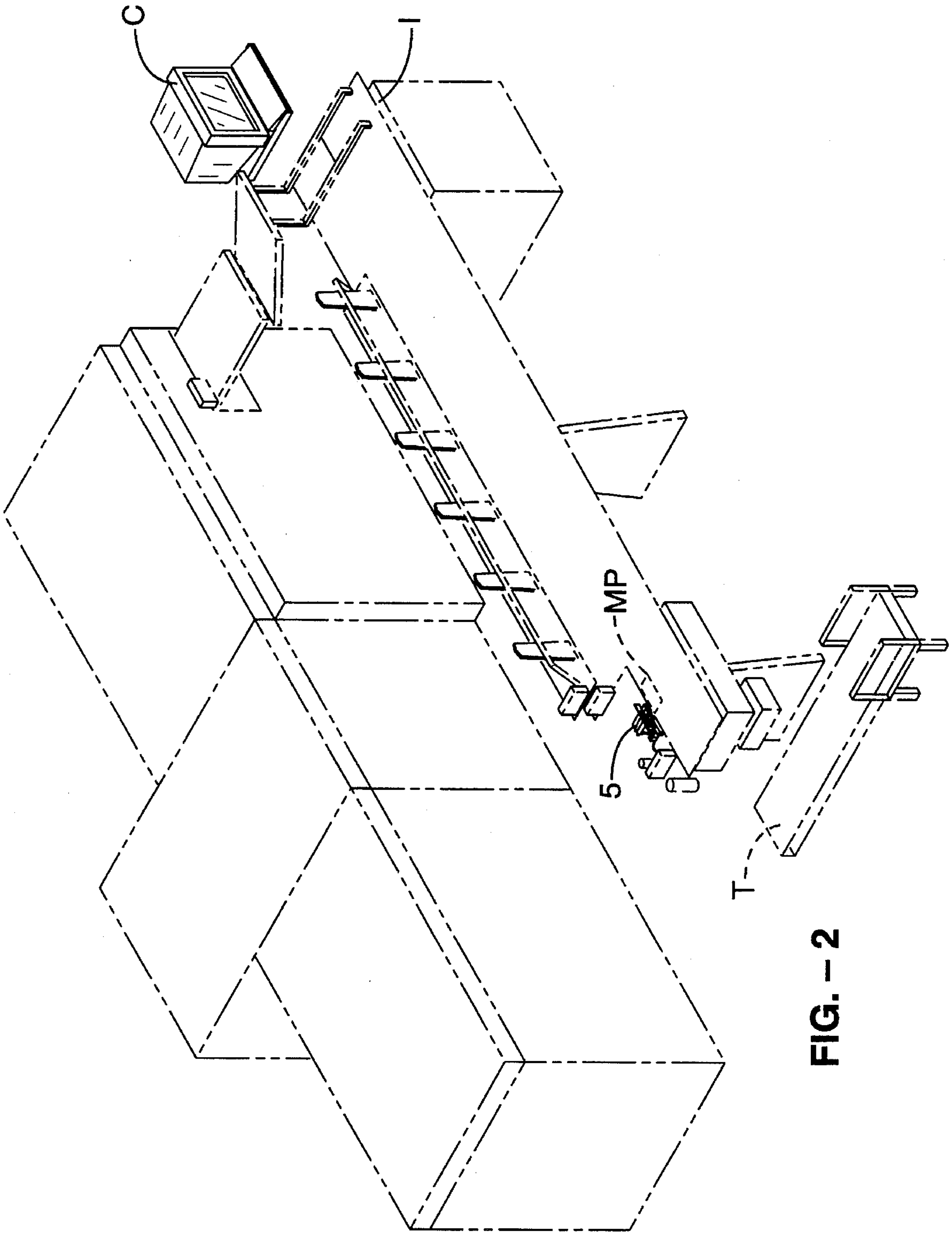
FIG. 2 is a perspective view of the subject invention secured to a generalized mailing piece handler.
Figure 3:
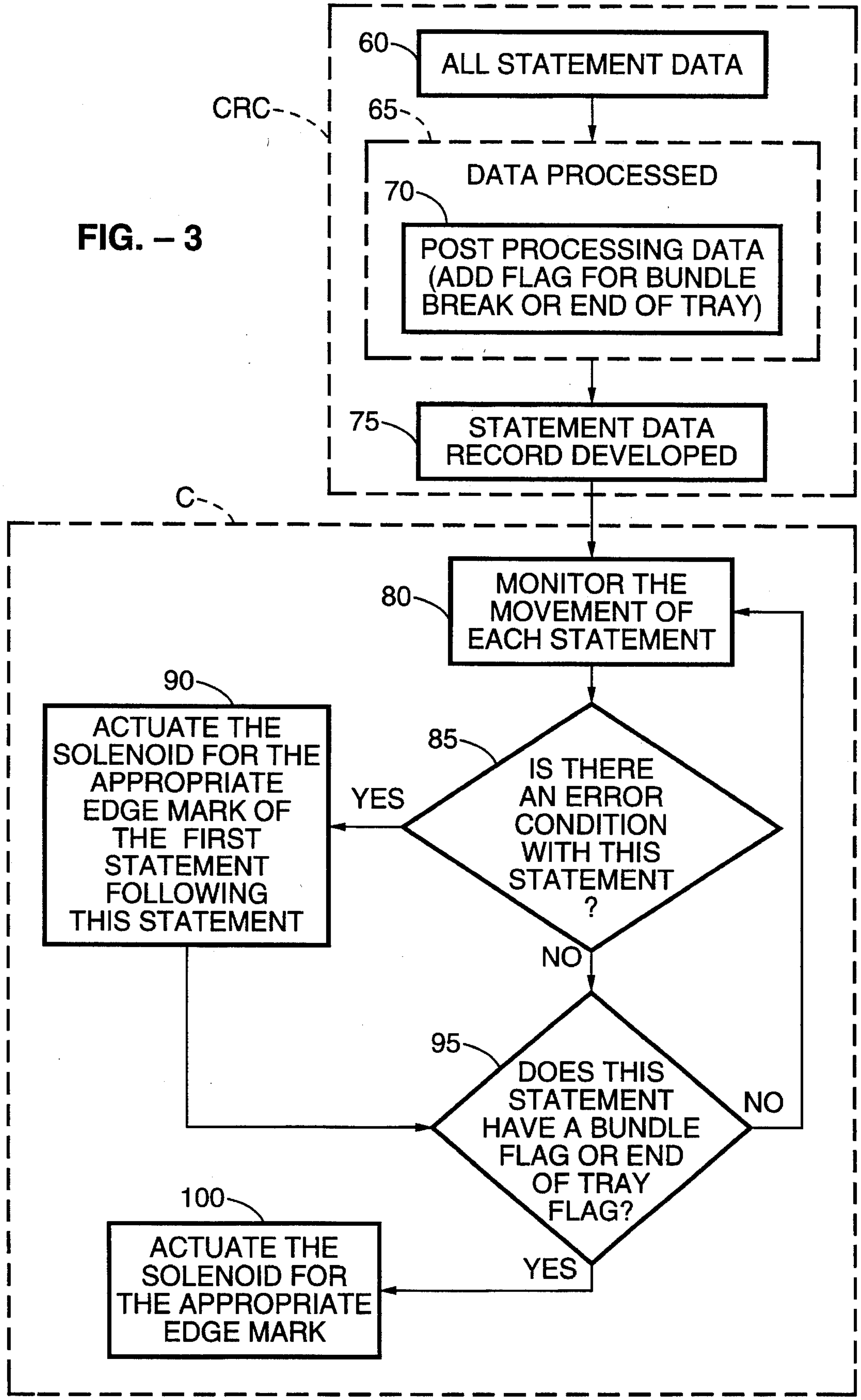
FIG. 3 is a flow diagram of the information utilized to control the subject edge marking apparatus.

Referring now to FIGS. 1–3, there is shown a preferred embodiment of a mailing piece marker system for placing indicia on the edge of a mailing piece. The subject system comprises an apparatus or system for marking the edge of a mailing piece with an operator or machine readable code. By marking the edge of a mailing piece an operator or machine can detect the presence of one or more marked items within a stack of similar items by merely viewing the edge of the complete stack, without the need of separating the stack into its component items.

The subject system includes means for determining if the edge of the mailing piece is to be marked, means for directing the marking of the edge of the mailing piece, and means for marking the edge of the mailing piece. FIG. 1 illustrates a preferred embodiment of the edge marking means 5. When directed by the controller or computer means (means for determining if the edge of the mailing piece is to be marked and the means for directing the marking of the edge of the mailing piece), an edge of a mailing piece is marked for either an operator or a machine to detect. For an operator to see easily, the mark is usually a broad dark brand. With such an easily visible mark or brand, an operator can quickly scan a stack of items with one or more marked individual items such as a packed mailing tray containing a stack of envelopes (or other edge marked items such as cards and the like) and see exactly where a required action is to be taken. A required action might involve noting where a mailing batch or mailing tray break should occur or where an error in a statement is detected by the controlling means.

The edge marking means 5 comprises an indicia placing means that transfers a characteristic mark to at least the edge of the mailing piece, usually, after the mailing piece is processed or assembled. The characteristic mark is either or both an operator readable or/and machine readable indicia. Operator readable indicia includes black, colored, patterned, or the like marks placed on the edge of the mailing piece. The mark is placed to permit detection of the mark when the mailing piece is stacked with other mailing pieces, usually similar, and aligned to permit only viewing of the edges.

More specifically, the edge marking means 5 comprises a plurality of indicia imprinting means. FIG. 1 depicts the plurality of indicia imprinting means as a series of solenoids 10 associated with the required components for the imprinting. Each solenoid 10 has a plunger 15 linked or secured to a marker housing 20. Within each marker housing 20 is a marker pad 25. The marker pad 25 includes a suitable ink, dye, or equivalent material for operator or machine detection and may include compounds such a magnetic or optically suitable substances and the like for machine detection. Each of the marking pads 25 within a set of solenoids 10 may have a characteristic ink color. Therefore, when desired, within a plurality of marking pads 25 found in the subject apparatus, the characteristic ink color is not duplicated in another solenoid linked marking pad 25. FIG. 1 shows three solenoids 10 and the ink for each associated pad 25 may be black or colored, as desired. By placing combinations of ink pad marks (a series of black with black, or black with other colors, or various colors, and the like) on the mailing piece edge various codes are communicated to an operator or reading machine.

Although other equivalent configurations are contemplated, preferably, the solenoids 10 are affixed to a mounting plate 30. The mounting plate is attached to a base member 33 that is a portion of a machine utilizing the subject invention or a separate element that fastens to a machine utilizing the subject invention.

The means for directing the use of the edge marker activates each required solenoid via a driving force such as electricity, pressure (either positive or negative pressure), and the like. Shown in FIG. 1 is a pressure driven solenoid apparatus. Required pressure is delivered through an appropriate valve and coupling component 35. Each solenoid 10 is connected via an attachment and control member 40 and by a pressure line 45 to the valve 35. The pressure line attachment and control member 40 feeds the pressure via standard lines 50 and 55 to activate or inactivate each solenoid 10. Each pressure line attachment and control member 40 functions to accept a signal or signals from the means directing the marking to occur. An (or more) electrical connector 60 transfers the activation or deactivation signal or signals to each solenoid 10 from the control means.

Generally, the subject system comprises, in addition to the marking means 5, either combined or separate means for determining if the edge of the mailing piece is to be marked and means for directing the marking of the edge of the mailing piece. As seen in FIG. 1, when a mailing piece MP is to be marked the mailing piece MP encounters the subject marking apparatus 5 by presenting an edge to be marked. For further clarity on how the subject invention functions, FIG. 2 is presented. FIG. 2 illustrates the subject invention incorporated into a typical setting involving an envelope inserter I. Once an envelope (mailing piece) MP is marked, the marked envelope MP is transferred to post marking equipment T.

As indicated, controlling the marking apparatus are means for determining if the edge of the mailing piece is to be marked and means for directing the marking of the mailing piece by the marking means 5. Preferably, the two determining and directing means are combined into a controller means, computer means, or computer C, shown in FIG. 2. The computer C is programmed (either hard or soft programming) with the requirements for determining if any mailing piece edge is to be marked. The programming may include accessing databases involving postal requirement and other information for any particular set of items being processed. Additionally and usually, the computer C is also programmed to activate the marking means 5 when the determining means determines the edge of the mailing piece is to be marked. Activation is generally by transmitting an appropriate signal to the marking means 5.

The following specific instance for implementing the subject system in a bulk mailing setting is presented by way of example only and not by way of limitation. The subject invention is utilized to place relevant information on the edges of envelopes that contain billing statements. Statement data is processed by a computer means and a record for each statement is developed. As the data is processed, relevant information (such as information for determining if the edge of the statement is to be marked) needed for handling the statement is added to the record. Statement handling includes but is not limited to mailing purposes such as filling a mailing tray efficiently and economically, qualifying for desirable bulk postal rates, and the like. Within the handling information for a particular record is a flag for a bundle break or the last statement in a mailing tray. When the statement is passing by the subject edge marking apparatus, the subject edge marker is activated and the envelope marked with a code to indicate that the envelope is at a bundle break, the last statement in a mailing tray, or the like.

Additionally, the computer means monitors the location and activities of each statement during processing for mailing. If an error condition (missing information, misprint, or the like) arises in a statement that will cause the statement to be diverted out of the normal flow for correction, the controller or computer means causes the statement following the erred statement to receive the appropriate edge mark code. An operator or other detection device identifies the edge mark code and performs the required action such as inserting a corrected statement or the like.

FIG. 3 illustrates a specific control scheme flow diagram for the computer means of the subject invention as involved in the above bulk mailing example. For processing billing statements the data is handled in a central computer room computer CRC. The data 60 for all of the statements is processed 65 and post processing additional data is attached 70 such as adding a flag for a mailing bundle break or an end of mailing tray notation. From this post processing data 70 a statement data record is developed 75.

Generally, the statement data record 75 is transferred physically or electronically to the subject system controller or computer C that monitors the movement of each statement 80 within the mailing process or assembly of a mailing packet or item containing the statement. The controller ask if there is an error condition detected with the statement 85. If an error condition is detected 90 a (this may be one or more) marking pad associated solenoid 10 is activated to mark the edge of the statement following the statement that had the error. If no error condition is detected 95, or the error has been detected and the edge marked, the computer C asks if the statement has a bundle flag or end of tray flag. If no flag is set the statement is passed on to any further processing, but if a flag is set 100 a (this may be one or more) marking pad associated solenoid 10 is activated to mark the appropriate edge. For example, the error condition detected in step 90 might cause a red mark to be placed on the edge of the statement, while a bundle flag might cause a green mark to be made, and an end of tray flag might cause a blue mark to be scored of the appropriate edge. Naturally, the exact colors or combinations of colors for the coding marks are arbitrary and are selectable for any particular situation.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A system for marking a perimeter edge of a mailing piece, comprising:

a) computer means for determining if the perimeter edge of the mailing piece is to be marked and for directing the marking of the perimeter edge of the mailing piece and b) means for marking the perimeter edge of the mailing piece, wherein said marking means comprises a plurality of indicia imprinting means, wherein each indicia imprinting means within said plurality of indicia imprinting means comprises a solenoid linked to a marking pad, wherein when said solenoid is activated said solenoid forces said marking pad against the mailing piece's perimeter edge thereby marking the perimeter edge of the mailing piece, thereby permitting identification of the marked mailing piece when the marked mailing piece is stacked with other mailing pieces.

2. A system for marking a perimeter edge of a mailing piece, comprising:

a) computer means for determining if the perimeter edge of the mailing piece is to be marked and for directing the marking of the perimeter edge of the mailing piece and b) indicia placing means for transferring a characteristic mark to at least the perimeter edge of the mailing a piece after the mailing piece is assembled, wherein said marking means comprises a plurality of indicia imprinting means, wherein each indicia imprinting means within said plurality of indicia imprinting means comprises a solenoid linked to a marking pad, wherein when said solenoid is activated said solenoid forces said marking pad against the mailing piece's perimeter edge thereby marking the perimeter edge of the mailing piece, thereby permitting identification of the marked mailing piece when the marked mailing piece is stacked with other mailing pieces.

3. An apparatus for marking a perimeter edge of a mailing piece, comprising an indicia placing means for transferring a characteristic mark to at least the perimeter edge of the mailing piece after the mailing piece is assembled, wherein said indicia placing means comprises a plurality of indicia imprinting means, wherein each indicia imprinting means within said plurality of indicia imprinting means comprises a solenoid linked to a marking pad, wherein when said solenoid is activated said solenoid forces said marking pad against the mailing piece's perimeter edge thereby marking the perimeter edge of the mailing piece, thereby permitting identification of the marked mailing piece when the marked mailing piece is stacked with other mailing pieces.

* * * * *